United States Patent
Kim et al.

(10) Patent No.: US 8,010,151 B2
(45) Date of Patent: Aug. 30, 2011

(54) SYSTEM AND METHOD FOR SERVICE INTERWORKING BETWEEN HETEROGENEOUS COMMUNICATION SYSTEMS

(75) Inventors: Tae-Young Kim, Seongnam-si (KR); Mi-Hyun Lee, Seoul (KR); Ho-Kyu Choi, Seongnam-si (KR); Jae-Weon Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 817 days.

(21) Appl. No.: 12/024,359

(22) Filed: Feb. 1, 2008

(65) Prior Publication Data
US 2008/0186939 A1    Aug. 7, 2008

(30) Foreign Application Priority Data
Feb. 1, 2007 (KR) ........................ 10-2007-0010805

(51) Int. Cl.
*H04M 1/00* (2006.01)
(52) U.S. Cl. .................. 455/552.1; 455/451; 455/452.1
(58) Field of Classification Search .................. 455/453, 455/403, 414.1, 417, 432.1, 432.2, 432.3, 455/434, 435.1, 435.2, 452.2, 511, 552.1, 455/445.1; 370/310, 328, 329, 331, 338, 370/498, 330, 344, 349
See application file for complete search history.

(56) References Cited

U.S. PATENT DOCUMENTS

| | | | | |
|---|---|---|---|---|
| 7,551,641 | B2 * | 6/2009 | Pirzada et al. | 370/465 |
| 7,596,120 | B2 * | 9/2009 | Kim et al. | 370/331 |
| 7,831,835 | B2 * | 11/2010 | Zhang et al. | 713/182 |
| 2002/0196770 | A1 * | 12/2002 | Lin | 370/349 |
| 2005/0254469 | A1 * | 11/2005 | Verma et al. | 370/338 |
| 2006/0092872 | A1 | 5/2006 | Lee et al. | |
| 2006/0229075 | A1 | 10/2006 | Kim et al. | |
| 2006/0246903 | A1 * | 11/2006 | Kong et al. | 455/437 |
| 2007/0133471 | A1 * | 6/2007 | Kim et al. | 370/331 |
| 2007/0173283 | A1 * | 7/2007 | Livet et al. | 455/552.1 |
| 2008/0056210 | A1 * | 3/2008 | Yaqub | 370/338 |
| 2008/0212512 | A1 * | 9/2008 | Harpek et al. | 370/315 |

FOREIGN PATENT DOCUMENTS

SU    1133673    1/1985

OTHER PUBLICATIONS

Specifications for 2.3GHz Band Portable Internet Service, TTA Standard, TTAS.KO-06.0082/R1, Dec. 21, 2005.

* cited by examiner

*Primary Examiner* — Jean A Gelin
(74) *Attorney, Agent, or Firm* — The Farrell Law Firm, P.C

(57) ABSTRACT

Disclosed is a system and method for service interworking between heterogeneous communication systems. The service interworking system includes a first system and a second system that is evolved from the first system and can decode control and broadcast signals used in the first system. The first and second systems provide services by using frequency bands that do not overlap with each other.

25 Claims, 9 Drawing Sheets

SYSTEM AND METHOD FOR SERVICE INTERWORKING BETWEEN HETEROGENEOUS COMMUNICATION SYSTEMS

PRIORITY

This application claims priority under 35 U.S.C. §119(a) to an application entitled "System and Method for Service Interworking between Heterogeneous Communication Systems" filed in the Korean Intellectual Property Office on Feb. 1, 2007 and assigned Serial No. 2007-0010805, the contents of which are incorporated herein by reference.

BACKGROUND OF THE INVENTION

1. Field of the Invention

The present invention relates to a mobile communication system, and in particular, to a system and method for service interworking between heterogeneous communication systems in a mobile communication system.

2. Description of the Related Art

Mobile communication systems are evolving into the form of a system that can provide various services, such as broadcasting, multimedia images, multimedia messages, etc. In particular, a $4^{th}$ Generation mobile communication system is being developed so as to provide high-speed mobile users with data services at a data transfer rate of 100 Mbps or greater and to provide low-speed mobile users with data services at a data transfer rate of 1 Gbps or greater while departing from services centered on voice and packet data communications.

Systems approximate to the $4^{th}$ Generation mobile communication system includes a portable Internet system. The portable Internet system is also called a Wireless Broadband (WiBro) communication system, and is compatible with communication systems based on IEEE (Institute of Electrical and Electronics Engineers) 801.16e.

The WiBro communication system has been commercialized or is under development for commercialization in some countries, and research is being conducted to evolve the WiBro communication system into a WiBro evolution communication system. The WiBro evolution communication system is aimed at supporting mobility up to 300 km per hour, supporting variable bandwidths, minimizing overhead, and so forth. An example of the WiBro evolution system is a communication system based on IEEE 802.16m.

The WiBro evolution communication system is intended to employ evolved technologies that have not been used in the WiBro communication system. Such evolved technologies include multiple antenna technology, IPv6 technology, multicast/broadcast service technology, and the like.

Assuming that the WiBro evolution communication system is implemented, the WiBro communication system must obviously interwork with the WiBro evolution communication system. However, the WiBro communication system and the WiBro evolution communication system may have different sub-channel structures or different signal formats. This means that the WiBro communication system and the WiBro evolution communication system are heterogeneous with respect to each other. Therefore, when the WiBro communication system and the WiBro evolution communication system coexist in a certain communication system, a specific way to solve the interworking problem between the WiBro communication system and the WiBro evolution communication system must be defined.

SUMMARY OF THE INVENTION

Accordingly, the present invention has been made to solve at least the above-mentioned problems, and the present invention provides a system and method for supporting service interworking between heterogeneous communication systems.

In accordance with an aspect of the present invention, there is provided a system for service interworking between heterogeneous communication systems. The system includes a first system including a mobile station; and a second system being different from the first system, and including a mobile station capable of decoding control and broadcast signals used in the first system, wherein the first and second systems are divided in a frequency division scheme.

In accordance with another aspect of the present invention, there is provided a system for service interworking between heterogeneous communication systems. The system includes a first system including a first mobile station; and a second system including a second mobile station, wherein a first downlink data burst assignment region for the first system and a second downlink data burst assignment region for the second system are divided in a time division scheme, and a first uplink data burst assignment region for the first system and a second uplink data burst assignment region for the second system are divided in a frequency division scheme.

In accordance with yet another aspect of the present invention, there is provided a method of transmitting/receiving a data burst in a mobile station according to service interworking between heterogeneous communication systems including different first and second systems, the mobile station belonging to the second system, the first and second systems providing services by using a frame divided into a downlink sub-frame and an uplink sub-frame, the downlink sub-frame being time-divided into a resource region for the first system and a resource region for the second system, and the uplink sub-frame being frequency-divided into a resource region for the first system and a resource region for the second system. the method includes acquiring synchronization by receiving a preamble used in common in the first and second systems; decoding a frame control header (FCH); recognizing a broadcast information region for the second system, based on the decoding of the FCH; demodulating/decoding a broadcast message received through the broadcast information region; and demodulating/decoding a downlink data burst in correspondence with the demodulated/decoded broadcast message, and transmitting an uplink data burst through an assigned uplink data burst region.

In accordance with yet another aspect of the present invention, there is provided a system for service interworking between heterogeneous communication systems. The system included a first system including a mobile station; and a second system being different from the first system, and including a mobile station capable of decoding control and broadcast signals used in the first system, wherein the first system is divided in a time division scheme and the second system is divided in a frequency division scheme.

BRIEF DESCRIPTION OF THE DRAWINGS

The above and other aspects, features and advantages of the present invention will become more apparent from the following detailed description when taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted when it may make the subject matter of the present invention rather unclear. Further, various specific definitions found in the following description are provided only to help general understanding of the present invention, and it is apparent to those skilled in the art that the present invention can be implemented without such definitions.

The present invention provides a system and method for service interworking between heterogeneous communication systems. Herein, as an example, the heterogeneous communication systems may be a Wireless Broadband (WiBro) communication system and a WiBro evolution communication system. The WiBro evolution communication system may have a different sub-channel structure or signal format from that of the WiBro communication system. However, since the WiBro evolution communication system is based on the WiBro communication system, it can decode control information provided to the WiBro communication system.

In the present invention, a frame structure is presented, which must be defined for service interworking between heterogeneous communication systems, that is, a first system and a second system. As used herein, the first system may be any one of the WiBro communication system, a mobile Worldwide Interoperability for Microwave Access (WiMAX) communication system, and a system defined in WiMAX Forum Mobile System Profile, release 1.0. Also, the second system may be the WiBro evolution communication system or a system based IEEE 802.16m.

Figure 1:
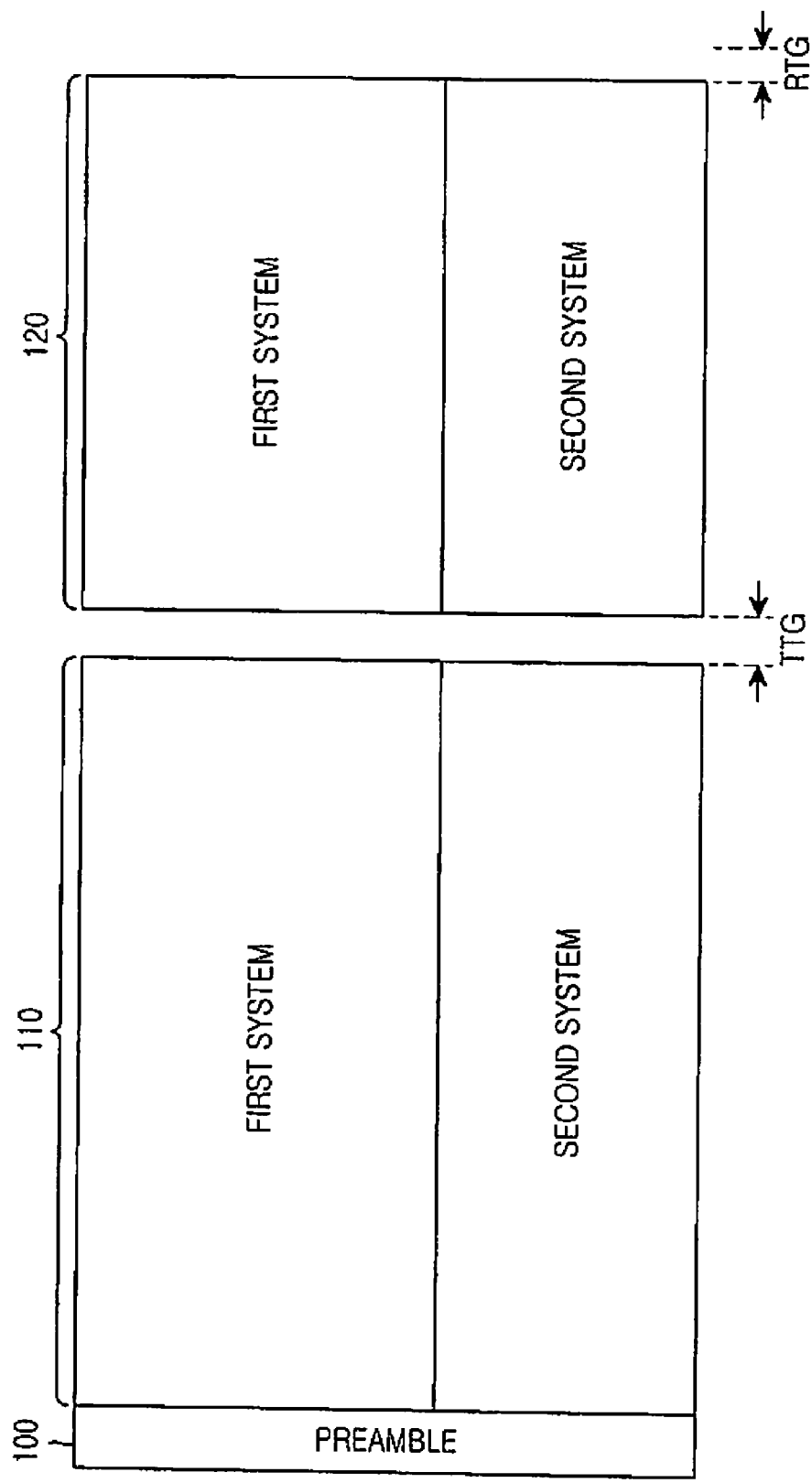
FIG. 1 is a view logically illustrating a frame structure presented in the present invention to support service interworking between heterogeneous communication systems.

FIG. 1 logically illustrates a frame structure presented in the present invention to support service interworking between heterogeneous communication systems. Referring to FIG. 1, the frame presented in the present invention has a structure in which a first system and a second system are supported by a frequency division method. In such a frame structure, the abscissa axis denotes the time axis, and the ordinate axis denotes the frequency axis. The time axis is defined by a symbol interval, and the ordinate axis is defined by a sub-carrier or a sub-channel. The sub-channel includes at least one sub-carrier. Hereinafter, a two-dimensional space occupied by any symbol interval and any frequency band is referred to as a "resource".

Although FIG. 1 shows that sub-channels used in the first and second systems are physically distinguished therebetween, the sub-channels may be logically configured. A physically configured sub-channel may consist of adjacent sub-carriers, and a logically configured sub-channel may consist of adjacent and non-adjacent sub-carriers. A method of configuring a sub-channel departs from the gist of the present invention, so a detailed description thereof will be omitted.

The frame includes a preamble 100 used in common in the first and second systems, and a downlink sub-frame 110 and an uplink sub-frame 120 that are frequency-divided for the first and second systems. The ratio of frequency resources used for each of the first and second systems in each of the downlink and uplink frames 110 and 120 may be determined fixedly at the early stage of system implementation or variably during system operation by the number of mobile stations using the corresponding system or other various factors.

Figure 2:
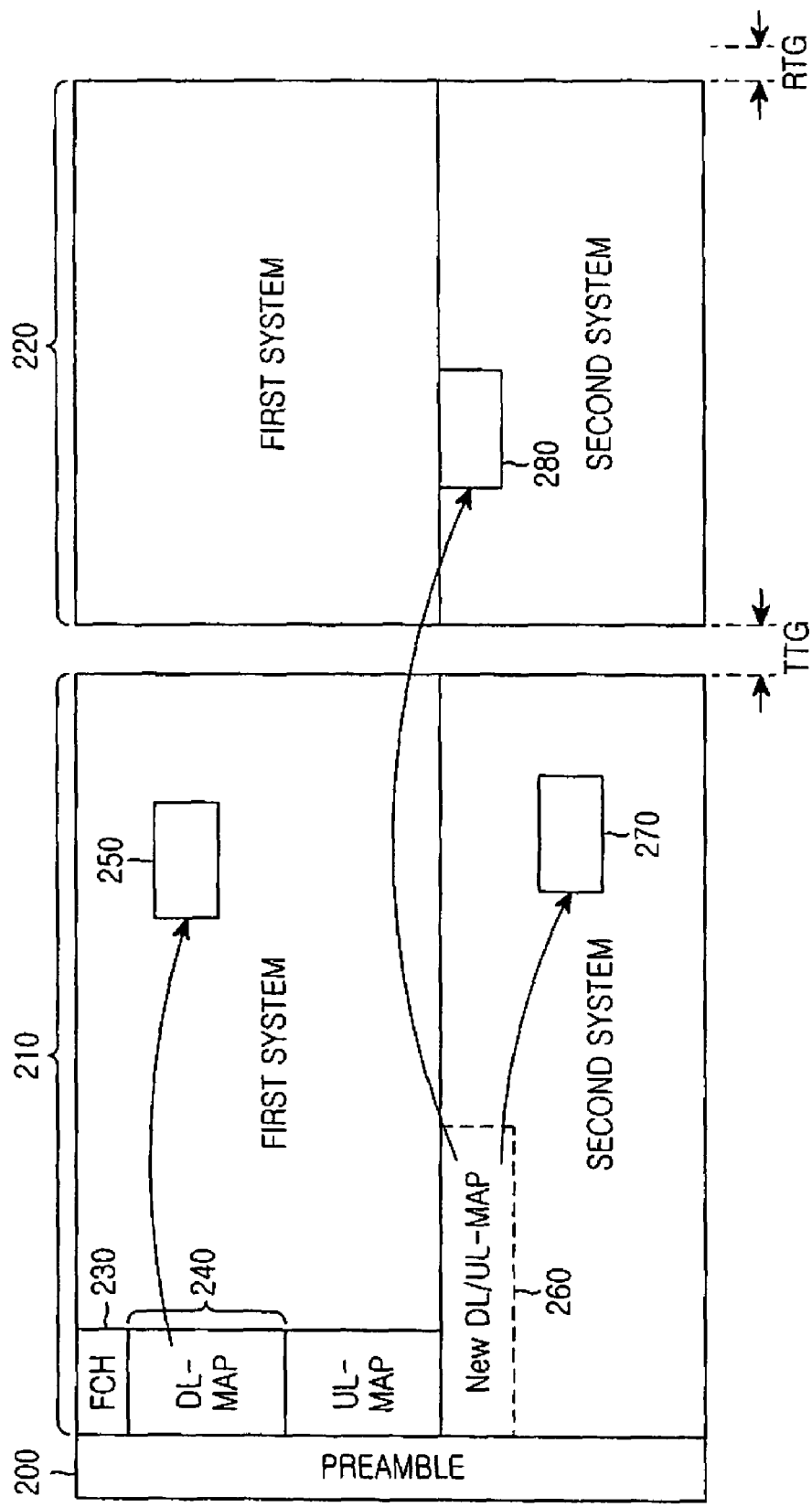
FIG. 2 is a view illustrating how to indicate data burst assignment in a frame in accordance with the present invention.

FIG. 2 illustrates how to indicate data burst assignment in a frame according to the present invention. Referring to FIG. 2, first and second systems use the same preamble 200. Thus, a first mobile station belonging to the first system acquires synchronization by means of the preamble 200, and can know a sub-channel configuration scheme, an MAP message modulation scheme, and a coding scheme by decoding the Frame Control Header (FCH) 230 of a downlink sub-frame 210. Thereupon, the first mobile station decodes the DL-MAP 240 for the first system to thereby recognize a downlink data burst region 250 assigned thereto.

In addition, a second mobile station belonging to the second system also acquires synchronization by means of the preamble 200, and then decodes the FCH 230 to thereby decode the New DL-MAP/UL-MAP 260 used in the second system. More specially, the second mobile station decodes the New DL-MAP 260 to thereby recognize a resource of a downlink data burst region 270, assigned thereto, and decodes the UL-MAP 260 to thereby recognize a resource of an uplink data burst region 280, assigned thereto, in the uplink sub-frame 220. The second mobile station decodes a data burst of the downlink data burst region 270, and transmits an uplink data burst to a base station through the uplink data burst region 280.

Figure 3:
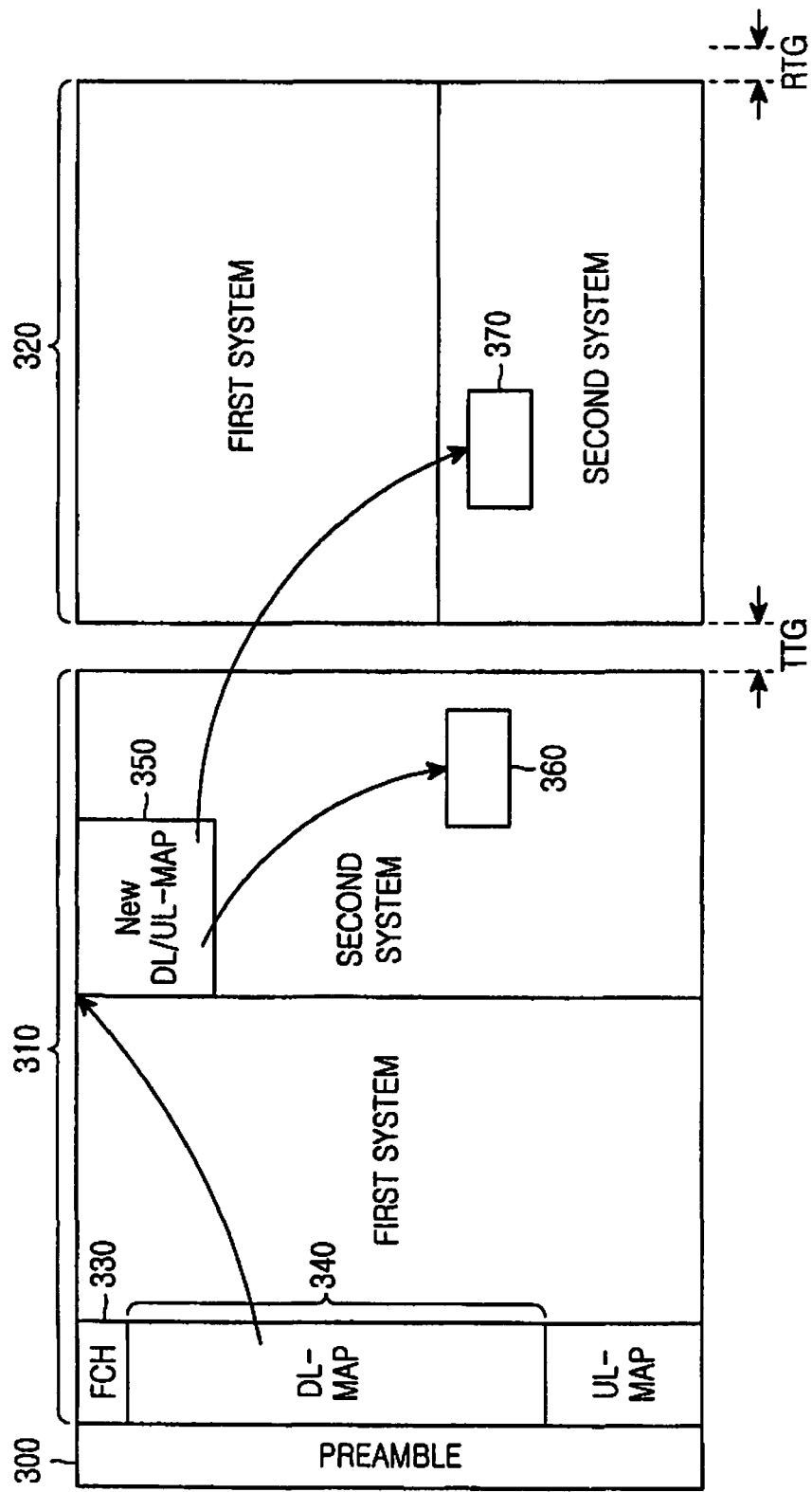
FIG. 3 is a view illustrating how to indicate data burst assignment in a frame in accordance with the present invention.

FIG. 3 illustrates how to indicate data burst assignment in a frame according to another exemplary embodiment of the present invention. Referring to FIG. 3, a downlink sub-frame 310 is divided into resources for first and second systems by using Time Division Multiplexing (TDM), and an uplink sub-frame 320 is divided into resources for the first and second systems by using Frequency Division Multiplexing (FDM). Dissimilar to this, it may also be possible to divide the downlink sub-frame 310 into resources for the first and second systems by using the FDM, and divide the uplink sub-frame 320 into resources for the first and second systems by using the TDM.

A mobile station belonging to the second system acquires synchronization by means of a preamble 300, and then decodes the FCH 330 of the downlink sub-frame 310 and the DL-MAP 340 for the first system to thereby recognize the New DL-MAP/UL-MAP region 350 that is control information for the second system. Dissimilar to this, when the New DL-MAP/UL-MAP region 350 exists in a predetermined location, the mobile station belonging to the second system can recognize the New DL-MAP/UL-MAP region 350 without decoding the FCH 330 and the DL-MAP 340 message. However, when the New DL-MAP/UL-MAP region 350 does not exist in a predetermined location, the mobile station belonging to the second system may decode only the FCH 330 without decoding the DL-MAP 340 message, and then decode the New DL/UL-MAP message.

The mobile station recognizes a resource 360 assigned thereto in a downlink data burst region and a resource 370 assigned thereto in an uplink data burst region by decoding a New DL-MAP message and a UL-MAP message received through the New DL-MAP/UL-MASP region 350. The FCH 330 includes information indicating whether or not there is a second system region.

Figure 4A:
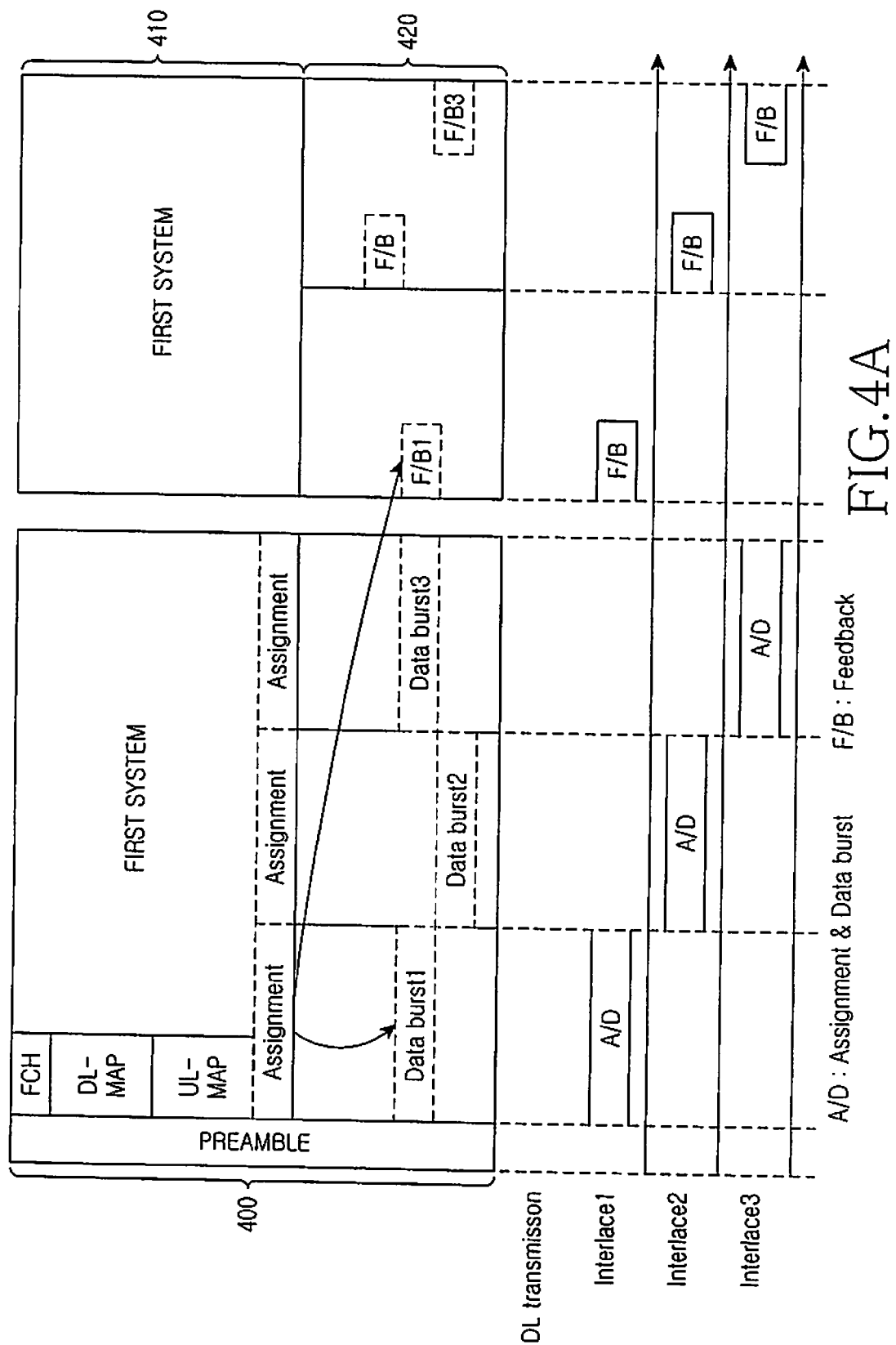
FIGS. 4A and 4B are views, each illustrating a frame structure presented for supporting short latency in accordance with the present invention.
Figure 4B:
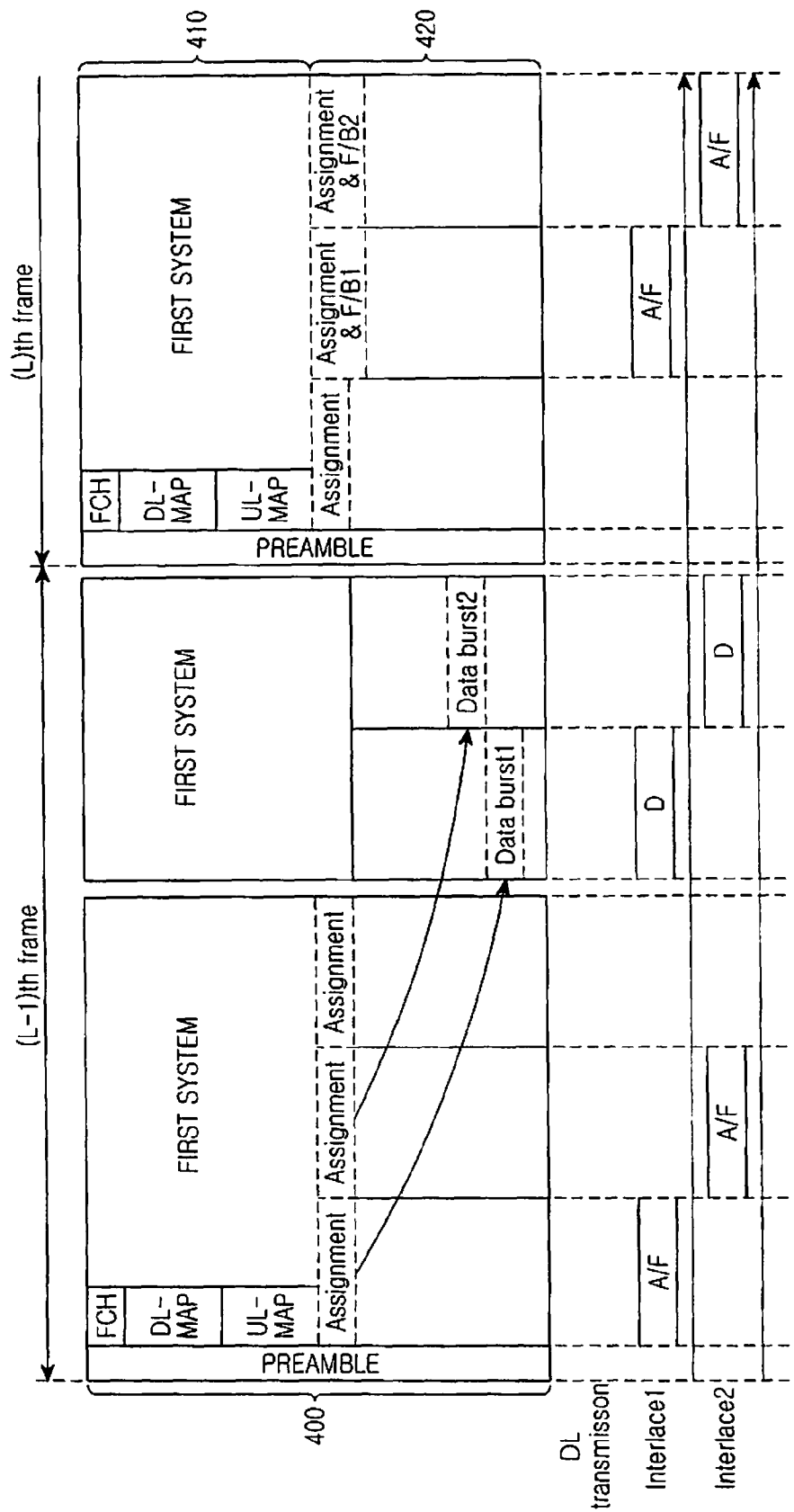

FIGS. 4A and 4B illustrate a frame structure presented for transmitting/receiving a short latency signal according to the present invention. Before the explanation of FIGS. 4A and 4B, it should be noted that short latency is required for high-speed data transmission in a mobile communication system. Typically, a Voice over Internet Protocol (VoIP) packet using Hybrid Automatic Repeat reQuest (HARQ) requires transmission/reception satisfying short latency.

Referring to FIGS. 4A and 4B, a frame 400 may be divided into a region 410 for a first system and a region 420 for a second system. First, FIG. 4A illustrates a frame structure for explaining downlink data burst transmission. In FIG. 4A, a first system region 410 of a downlink sub-frame includes three assignment regions. A second system region 420 of an uplink sub-frame includes three regions corresponding to three time intervals into which the overall time interval of the downlink sub-frame for the second system is divided. Location information of a data burst transmission region in the second system and location information of a feedback region for the second system in the uplink sub-frame are indicated in the assignment regions. In addition, in the uplink sub-frame, the second system region 420 occupies two time-divided data burst regions.

For transmission/reception satisfying short latency, the frame must be operated in a plurality of interlace structures. Here, the interlace structure refers to a structure in which data transmission (retransmission) is interlaced with feedback reception in response thereto or data reception (rereception) is interlaced with feedback transmission (retransmission) in response thereto.

Considering interlace 1 in uplink data transmission, a base station transmits assignment information and a data burst through the first assignment region and data burst region 1 (data burst 1), and receives a feedback thereto through a feedback region of the first data burst region of the uplink sub-frame.

FIG. 4B illustrates a frame structure for explaining uplink data burst transmission. In interlace 1, a mobile station receives assignment information in the (L-1)th downlink sub-frame, and transmits a data burst in the (L-1)th uplink sub-frame. Subsequently, the mobile station receives a feedback signal from a base station in the next frame. The feedback signal refers to an acknowledgement (ACK) or non-acknowledgement (NACK) signal indicating whether or not the base station normally receives the signal from the mobile station.

Figure 5:
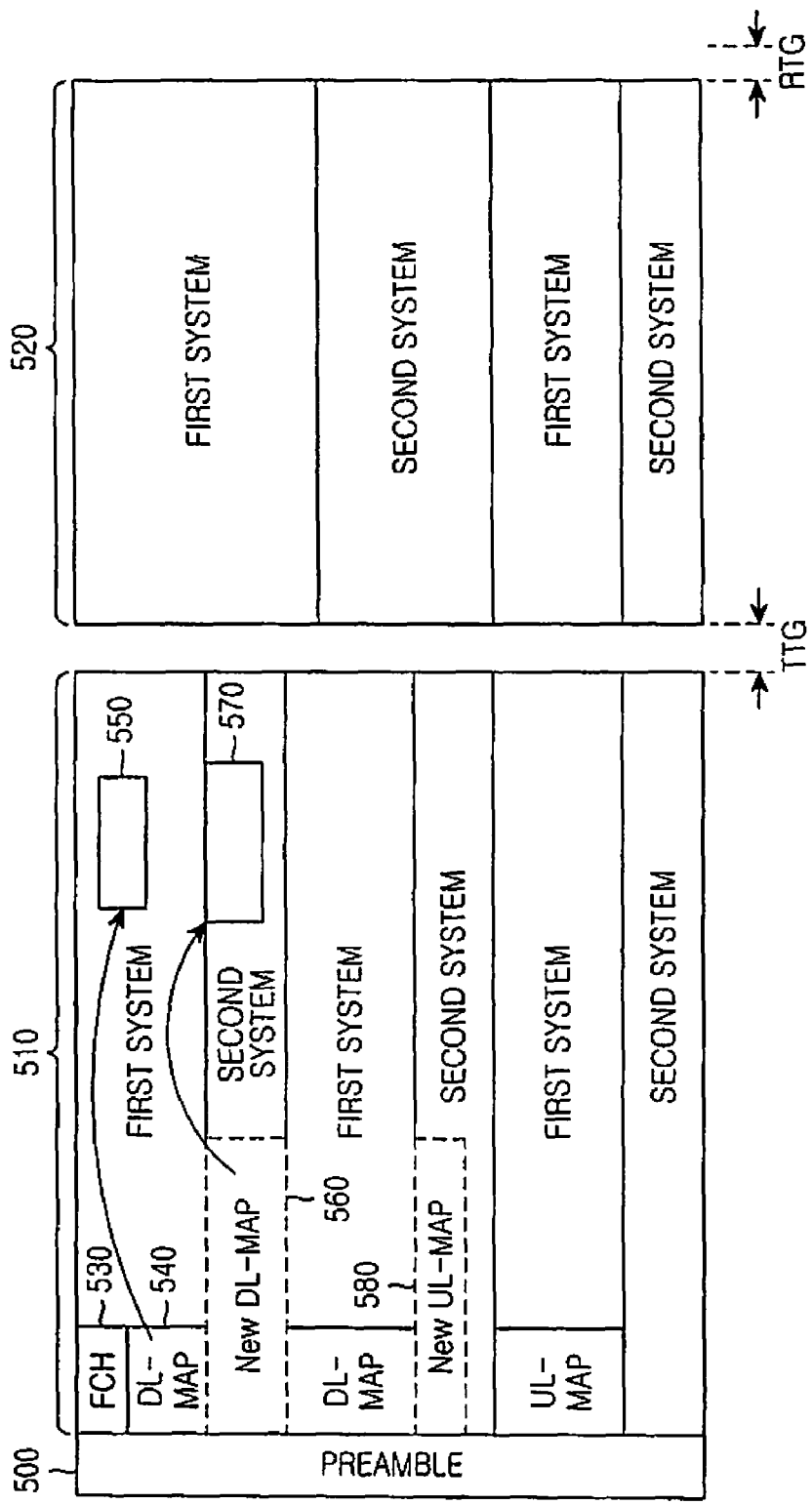
FIG. 5 is a view illustrating a frame structure using the overall frequency band in accordance with the present invention.

FIG. 5 illustrates a frame structure using the overall frequency band according to the present invention. Referring to FIG. 5, in a structure called partial usage of sub-channels, which is defined in the IEEE 802.16 standards, the overall frequency band may be divided into six sub-channels. Among these sub-channels, three sub-channels may be used in a first system, and the remaining three sub-channels may be used in a second system. The number of sub-channels used in each of the first and second systems may vary during system operation. That is, if the number of mobile stations using the second system is increased, the sub-channels used in the first system may also be used in the second system.

In FIG. 5, it is assumed that the six sub-channels assigned to the first and second systems are all used in the systems. In a downlink sub-frame, assigned sub-channels may be indicated using a bitmap for usage of sub-channels within the FCH. In an uplink sub-frame, assigned sub-channels may be indicated using bitmap information within the DL-MAP message and the UL-MAP message.

Figure 6:
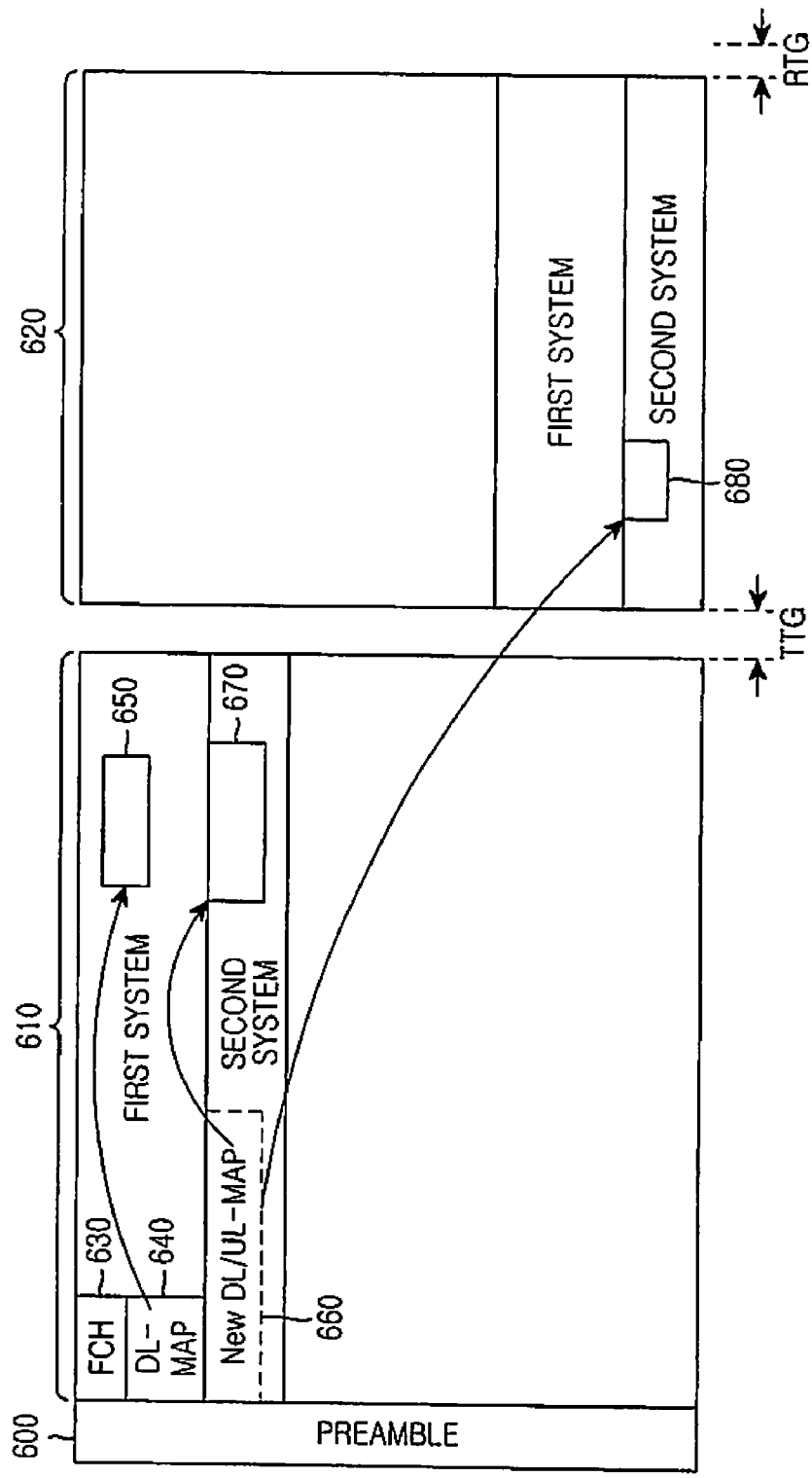
FIG. 6 is a view illustrating a frame structure using a partial frequency band in accordance with the present invention.

FIG. 6 illustrates a frame structure using a partial frequency band according to the present invention. Referring to FIG. 6, a data burst assignment region 650 for a first system is indicated through the DL-MAP region 640, and a data burst assignment region 670 is indicated through the New DL/UP-MAP region 660. FIG. 6 shows that data burst assignment region indication and data burst assignment are accomplished using not the overall frequency band, but a partial frequency band. When a bitmap for usage of sub-channels, set in the FCH, is specified as "110000", a mobile station can recognize that the overall frequency band is not used, but a partial frequency band is used.

Figure 7:
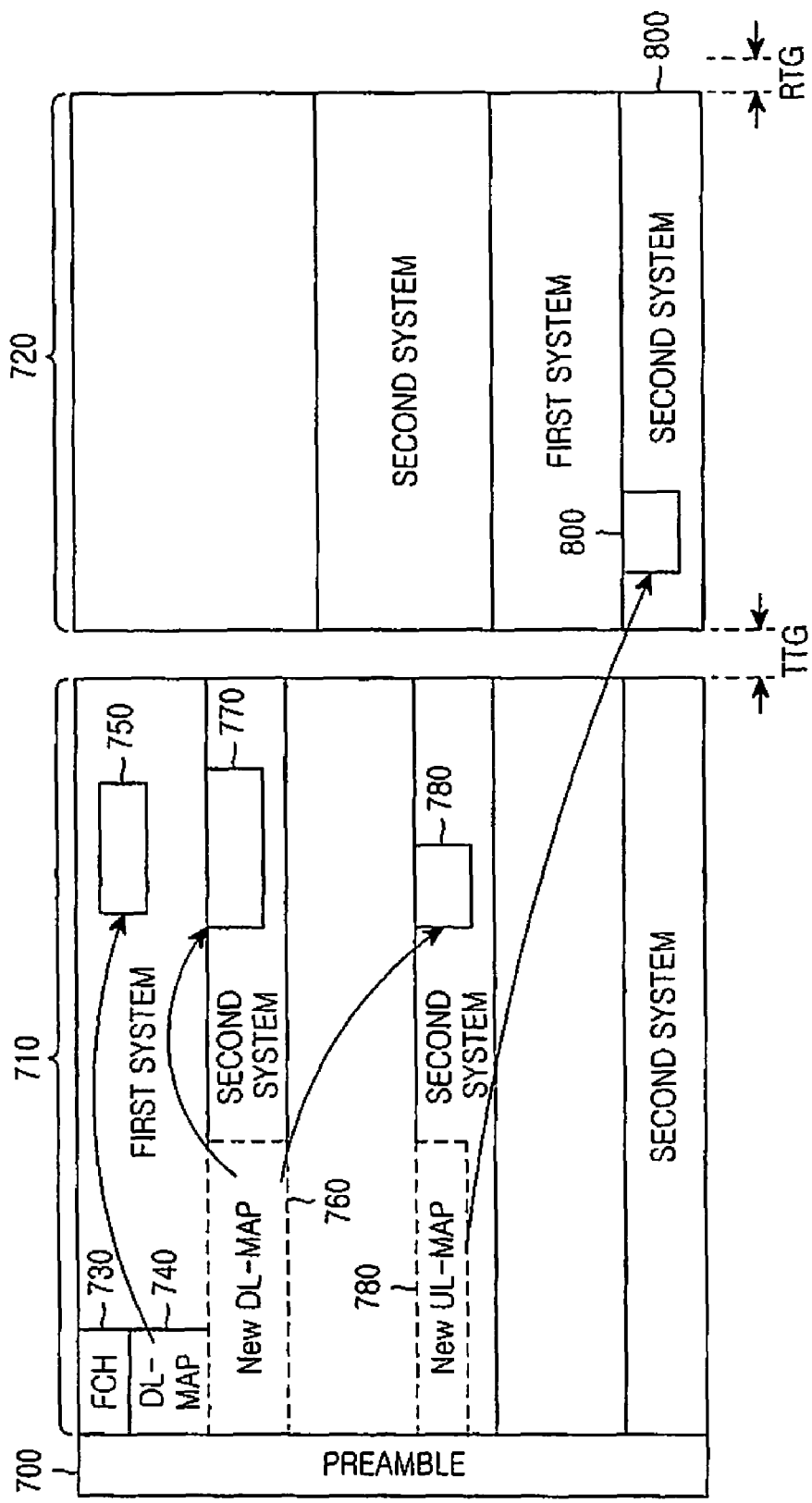
FIG. 7 is a view illustrating a frame structure using different-sized frequency bands between heterogeneous communication systems in accordance with the present invention.

FIG. 7 illustrates a frame structure using different-sized frequency bands between heterogeneous communication systems according to the present invention. Referring to FIG. 7, a first system uses a partial frequency band, and a second system uses the overall frequency band. For example, the first system may manage with a frequency reuse factor of 3, and the second system may manage with a frequency reuse factor of 1.

Figure 8:
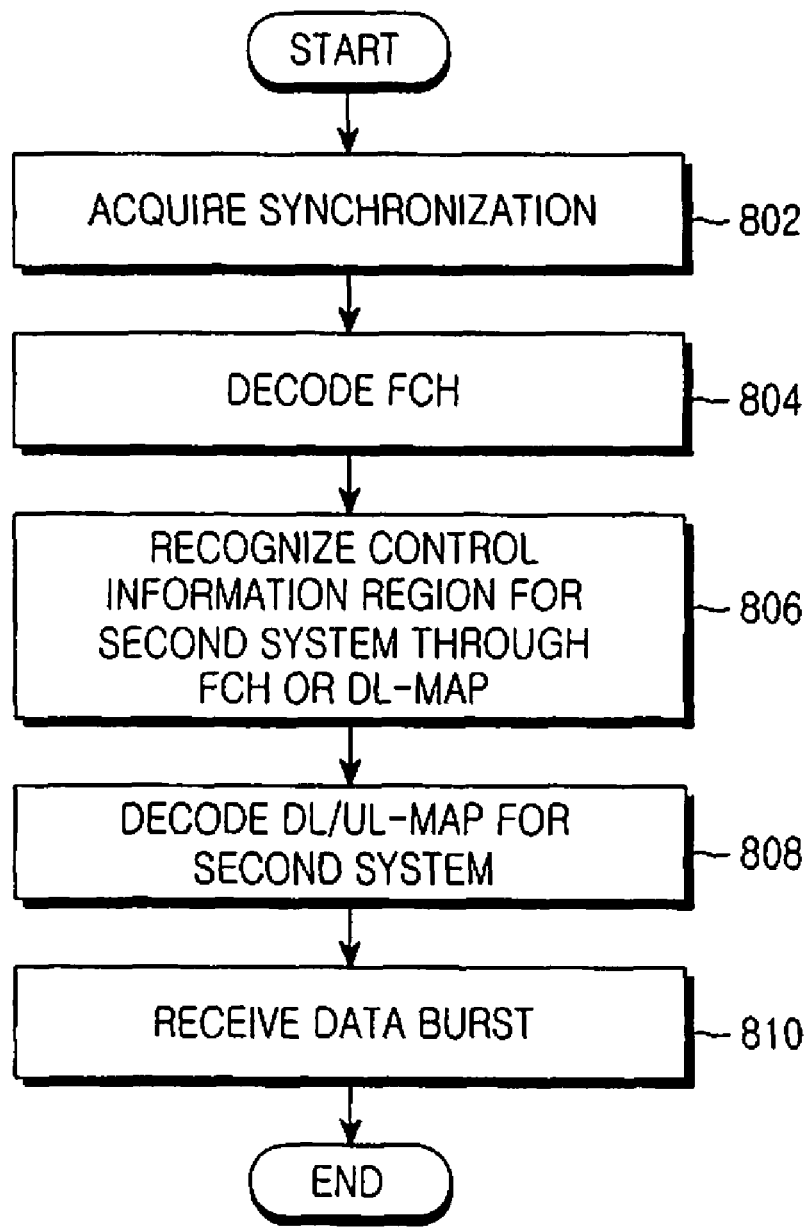
FIG. 8 is a flowchart illustrating a procedure performed by a mobile station belonging to a second system until the mobile station receives a data burst by using a new frame.

FIG. 8 illustrates a procedure performed by a mobile station belonging to a second system until the mobile station receives a data burst by using a new frame. Referring to FIG. 8, in step 802, the mobile station acquires synchronization by means of a preamble used in common in a first system and the second system, and then proceeds to step 804. In step 804, the mobile station decodes an FCH existing in a downlink sub-frame for the first system, and then proceeds to step 806. In step 806, the mobile station recognizes a broadcast information region, that is, DL-MAP/UL-MAP, for the second system through information included in the FCH or DL-MAP that is decoded following the FCH decoding, and then proceeds to step 808. In step 808, the mobile station decodes the DL-MAP/UL-MAP for the second system, and the proceeds to step 810. In step 810, the mobile station receives in a data burst region indicated by the DL-MAP or UL-MAP.

As described above, service interworking between an existing communication and an evolved communication system can be provided using a frame structure presented in the present invention.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A system for service interworking between heterogeneous communication systems, the system comprising:
  a first system serving a first mobile station; and
  a second system serving a second mobile station,
    wherein the service interworking is provided between the first and second systems, which are included in the heterogeneous communications systems and provide services by using a frame divided into a downlink region and an uplink region, the downlink region being time-divided into a first downlink assignment region for the first system and a second downlink assignment region for the second system, and the uplink region being frequency-divided into a first uplink assignment region for the first system and a second uplink assignment region for the second system.

2. The system as claimed in claim 1, wherein the first mobile station demodulates and decodes a first downlink MAP message and a first uplink MAP message in the first downlink assignment region provided from the first system to thereby demodulate and decode a data burst assigned thereto in the first downlink assignment region and recognize the first uplink assignment region, and wherein the second mobile station demodulate and decodes a second downlink MAP message and a second uplink MAP message in the second downlink assignment region for the second system.

3. The system as claimed in claim 2, wherein the second mobile station demodulates and decodes the second downlink MAP messageto thereby demodulates and decodes a data burst assigned thereto in the second downlink assignment region for the second system.

4. The system as claimed in claim 2, wherein the second mobile station demodulates and decodes the second uplink MAP messageto thereby recognize a data burst assigned thereto in the second uplink assignment region for the second system.

5. The system as claimed in claim 1, wherein the first system comprises one of a communication system based on IEEE 802.16e, a Wireless Broadband (WiBro) communication system, and a mobile Worldwide Interoperability for Microwave Access (WiMAX) communication system, and the second system comprises a communication system based on IEEE 802.16m.

6. The system as claimed in claim 1, wherein the second downlink assignment region includes a downlink MAP message and a uplink MAP message for the second system in a predetermined location.

7. A method of transmitting and receiving data bursts in a mobile station according to service interworking between heterogeneous communication systems including first and second systems, the mobile station belonging to the second system, the method comprising:

demodulating and decoding a broadcast message received through a broadcast information region for the second system; and demodulating and decoding a downlink data burst in correspondence with the demodulated and decoded broadcast message, and transmitting an uplink data burst through an assigned uplink data burst region, wherein the first and second systems provide services by using a frame divided into a downlink region and an uplink region, the downlink region being time-divided into a first downlink assignment region for the first system and a second downlink assignment region for the second system, and the uplink region being frequency-divided into a first uplink assignment region for the first system and a second uplink assignment region for the second system, and wherein the data bursts are transmitted and received in the mobile station according to the service interworking between the first and second systems.

8. The method as claimed in claim 7, wherein the first system comprises one of a communication system based on IEEE 802.16e, a Wireless Broadband (WiBro) communication system, and a mobile Worldwide Interoperability for Microwave Access (WiMAX) communication system, and the second system comprises a communication system based on IEEE 802.16m.

9. The method as claimed in claim 7, wherein the broadcast message comprises uplink and downlink resource assignment second systems.

10. The method as claimed in claim 7, wherein the broadcast message comprises a downlink MAP message and an uplink MAP message being transmitted in the second downlink assignment region for the second system.

11. The method as claimed in claim 10, wherein the downlink MAP message indicates at least one data burst assigned to the mobile station in the second downlink assignment region for the second system.

12. The method as claimed in claim 10, wherein the uplink MAP message indicates at least one data burst assigned to the mobile station in the second uplink assignment region for the second system.

13. The method as claimed in claim 7, wherein the second downlink assignment region includes a downlink MAP message and a uplink MAP message for the second system in a predetermined location.

14. A method of transmitting and receiving data bursts in a base station according to service interworking between heterogeneous communication systems including first and second systems, the method comprising:

communicating with at least one mobile station each belonging to one of the first and second systems, by using a frame divided into a downlink region and an uplink region, wherein the downlink region is time-divided into a first downlink assignment region for the first system and a second downlink assignment region for the second system, and the uplink region is frequency-divided into a first uplink assignment region for the first system and a second uplink assignment region for the second system, and wherein the data bursts are transmitted and received in the base station according to the service interworking between the first and second systems.

15. The method as claimed in claim 14, wherein the first downlink assignment region provides a first downlink MAP message and a first uplink MAP message indicating at least one data burst for a first mobile station belonging the first system, assigned in the first downlink assignment region and the first uplink assignment region, and the second downlink assignment region provides a second downlink MAP message and a second uplink MAP message indicating at least one data burst for a second mobile station belonging the second system, assigned in the second downlink assignment region and the second uplink assignment region.

16. The method as claimed in claim 14, wherein the first system comprises one of an IEEE 802.16e communication system, a Wireless Broadband (WiBro) communication system, and a mobile Worldwide Interoperability for Microwave Access (WiMAX) communication system, and the second system comprises a IEEE 802.16m communication system.

17. The method as claimed in claim 14, wherein the second downlink assignment region includes a downlink MAP message and a uplink MAP message for the second system in a predetermined location.

18. An apparatus in a mobile station of transmitting and receiving data bursts according to service interworking between heterogeneous communication systems including first and second systems, the apparatus comprising:

a transceiver for communicating with a base station by using a frame divided into a downlink region and an uplink region, wherein the downlink region is time-divided into a first downlink assignment region for the first system and a second downlink assignment region for the second system, and the uplink region is frequency-divided into a first uplink assignment region for the first system and a second uplink assignment region for the second system, and wherein the data bursts are transmitted and received in the mobile station according to the service interworking between the first and second systems.

19. The apparatus as claimed in claim 18, wherein the first downlink assignment region provides a first downlink MAP message and a first uplink MAP message indicating at least one data burst for a first mobile station belong the first system, assigned in the first downlink assignment region and the first uplink assignment region, and the second downlink assignment region provides a second downlink MAP message and a second uplink MAP message indicating at least one data burst for a second mobile station belong the second system, assigned in the second downlink assignment region and the second uplink assignment region.

20. The apparatus as claimed in claim 18, wherein the first system comprises one of an IEEE 802.16e communication system, a Wireless Broadband (WiBro) communication system, and a mobile Worldwide Interoperability for Microwave Access (WiMAX) communication system, and the second system comprises a IEEE 802.16m communication system.

21. The apparatus as claimed in claim 18, wherein the second downlink assignment region includes a downlink MAP message and a uplink MAP message for the second system in a predetermined location.

22. An apparatus in a base station of transmitting and receiving data bursts according to service interworking between heterogeneous communication systems including first and second systems, the apparatus comprising:

a transceiver for communicating with at least one mobile station each belonging to one of the first and second systems, by using a frame divided into a downlink region and an uplink region, wherein the downlink region is time-divided into a first downlink assignment region for the first system and a second downlink assignment region for the second system, and the uplink region is frequency-divided into a first uplink assignment region for the first system and a second uplink assignment region for the second system, and wherein the data bursts are transmitted and received in the base station according to the service interworking between the first and second systems.

23. The apparatus as claimed in claim 22, wherein the first downlink assignment region provides a first downlink MAP message and a first uplink MAP message indicating at least one data burst for a first mobile station belonging the first system, assigned in the first downlink assignment region and the first uplink assignment region, and the second downlink assignment region provides a second downlink MAP message and a second uplink MAP message indicating at least one data burst for a second mobile station belonging the second system, assigned in the second downlink assignment region and the second uplink assignment region.

24. The apparatus as claimed in claim 22, wherein the first system comprises one of an IEEE 802.16e communication system, a Wireless Broadband (WiBro) communication system, and a mobile Worldwide Interoperability for Microwave Access (WiMAX) communication system, and the second system comprises a IEEE 802.16m communication system.

25. The apparatus as claimed in claim 22, wherein the second downlink assignment region includes a downlink MAP message and a uplink MAP message for the second system in a predetermined location.

* * * * *